(12) United States Patent
Kashima

(10) Patent No.: US 7,030,949 B2
(45) Date of Patent: Apr. 18, 2006

(54) OPTICAL DISPLAY INCLUDING A CHOLESTERIC LAYER, A DISPLAY DEVICE AND A DIFFUSING LAYER ON AN EXIT SIDE OF THE CHOLESTERIC LAYER

(75) Inventor: Keiji Kashima, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 169 days.

(21) Appl. No.: 10/156,770

(22) Filed: May 29, 2002

(65) Prior Publication Data

US 2002/0180915 A1  Dec. 5, 2002

(30) Foreign Application Priority Data

Jun. 1, 2001  (JP) ............................. 2001-167293

(51) Int. Cl.
G02F 1/1333 (2006.01)
G02F 1/1335 (2006.01)
C09K 19/02 (2006.01)

(52) U.S. Cl. .................. 349/115; 349/98; 349/106; 349/112; 349/175

(58) Field of Classification Search .............. 349/112, 349/115, 98, 106, 175, 176
See application file for complete search history.

(56) References Cited

U.S. PATENT DOCUMENTS

| | | | |
|---|---|---|---|
| 4,410,570 A | 10/1983 | Kreuzer et al. ........... 427/374.1 |
| 5,796,454 A * | 8/1998 | Ma ............................. 349/98 |
| 6,103,323 A * | 8/2000 | Motomura et al. ........... 428/1.3 |
| 6,147,937 A * | 11/2000 | Arikawa et al. ............ 368/242 |
| 6,177,216 B1 | 1/2001 | Broer et al. .................... 430/7 |
| 6,184,949 B1 | 2/2001 | Cornelissen et al. .......... 349/64 |
| 6,204,908 B1 * | 3/2001 | Hashimoto et al. ......... 349/176 |
| 6,266,113 B1 * | 7/2001 | Yamazaki et al. .......... 349/115 |
| 6,633,354 B1 * | 10/2003 | Li et al. ..................... 349/115 |
| 6,693,688 B1 * | 2/2004 | Hisatake et al. ............ 349/113 |
| 6,707,519 B1 | 3/2004 | Okumura et al. ........... 349/114 |
| 2001/0003359 A1 * | 6/2001 | Izumi et al. ........... 252/299.61 |
| 2001/0055089 A1 * | 12/2001 | Van De Witte et al. ..... 349/185 |
| 2002/0036735 A1 * | 3/2002 | Arakawa et al. ............ 349/115 |
| 2002/0075434 A1 * | 6/2002 | Jiang et al. ................. 349/129 |
| 2002/0130993 A1 * | 9/2002 | Ichihashi et al. ........... 349/106 |
| 2003/0063245 A1 * | 4/2003 | Bowley et al. ............. 349/115 |
| 2003/0076468 A1 * | 4/2003 | Ichihashi .................... 349/115 |

FOREIGN PATENT DOCUMENTS

| | | | |
|---|---|---|---|
| JP | 6-281814 | * | 10/1994 |
| JP | 07-258638 | | 10/1995 |
| JP | 11-023738 | * | 1/1999 |
| JP | 2000-89018 | | 3/2000 |
| KR | 2001-0005933 | | 10/2001 |
| WO | WO 00/70400 | | 11/2000 |

* cited by examiner

Primary Examiner—Tarifur R. Chowdhury
(74) Attorney, Agent, or Firm—Oliff & Berridge, PLC

(57) ABSTRACT

A wavelength-selecting optical element includes a cholesteric layer that reflects or transmits either of a right-handed circularly polarized light component and a left-handed circularly polarized light component in a selected wavelength band of an incident light; and a diffusing layer disposed on the exit side of the cholesteric layer to diffuse the circularly polarized light component reflected or transmitted by the cholesteric layer. The cholesteric layer may be a color filter having a red, a green and a blue pixel region for each of pixels. Each of the pixel regions reflects or transmits either of a right-handed circularly polarized light component and a left-handed circularly polarized light component in a selected wavelength band of an incident light.

10 Claims, 7 Drawing Sheets and a diffusing layer on an exit side of the cholesteric layer

BACKGROUND OF THE INVENTION

1. Field of the Invention

The present invention relates to a wavelength-selecting optical element to be incorporated into an optical display, such as a liquid crystal display, and more particularly, to a wavelength-selecting optical element adapted to selectively reflect or transmit a circularly polarized light component of a selected wavelength rotating in one direction, and an optical display provided with the same.

2. Description of the Related Art

A wavelength-selecting optical element provided with a cholesteric layer has been employed as a color filter in conventional liquid crystal displays and the like. The term "liquid crystal layer" used herein means a layer having the properties of liquid crystal in the optical sense, and includes not only a layer of liquid crystal phase having flowability but also a layer of solid phase obtained by solidifying liquid crystal phase while retaining the alignment of molecules characteristic of the liquid crystal phase.

The cholesteric layer has a rotatory light-selecting characteristic (polarized light separating characteristic) capable of separating a circularly polarized light component of one direction and that of the opposite direction from each other on the basis of physical molecular arrangement (planar arrangement). Light incident on such a cholesteric layer along the helical axis of a planar arrangement is separated into a right-handed circularly polarized light component and a left-handed circularly polarized light component. Either the right-handed or the left-handed circularly polarized light component is reflected and the other light component is transmitted. This phenomenon is generally known as circular dichroism. The rotating direction of the circularly polarized light component of the incident light is selected properly to reflect or transmit a circularly polarized light component having a rotating direction corresponding to that of the helical axis of the cholesteric layer. A maximum optical rotatory dispersion of an outgoing light occurs at a wavelength $\lambda_0$ expressed by Expression (1):

$$\lambda_0 = n_{av} \cdot p, \quad (1)$$

where p is chiral pitch (helical pitch) and $n_{av}$ is average refractive index in a plane perpendicular to the helical axis.

Bandwidth $\Delta\lambda$ of wavelengths of the outgoing light is expressed by Expression (2):

$$\Delta\lambda = \Delta n \cdot p, \quad (2)$$

where $\Delta n$ is index of birefringence and p is chiral pitch.

Thus, the cholesteric layer reflects one of a right-handed of a left-handed circularly polarized light component in the wavelength range of a bandwidth $\Delta\lambda$ having a center wavelength $\lambda_0$ and transmits the other circularly polarized light component and light waves of wavelengths outside the aforesaid wavelength range.

When the helical axis of the cholesteric layer of this known wavelength-selecting optical element is, for example, parallel to a normal to a substrate, the apparent pitch of the cholesteric layer increases when the cholesteric layer is viewed from a direction oblique to the normal to the substrate. Therefore, the wavelength of the light wave reflected or transmitted by the cholesteric layer shifts toward the side of shorter wavelengths.

Expression (1) is modified by taking a viewing angle $\theta$ (angle of a viewing direction to the normal to the surface of the substrate) into consideration and obtained is Expression (3):

$$\lambda_0 = n_{av} \cdot p \cdot \cos\theta. \quad (3)$$

It is known from Expression (3) that the wavelength $\lambda_0$ decreases with the increase of the viewing angle $\theta$. Therefore, the hues of colors of an image displayed by an optical display provided with this wavelength-selecting optical element vary for color shift according to the viewing direction.

SUMMARY OF THE INVENTION

The present invention has been made in view of the foregoing problem and it is therefore an object of the present invention to provide a wavelength-selecting optical element capable of preventing the change of hues of colors of displayed images dependent on viewing direction to improve image quality, and an optical display provided with such a wavelength-selecting optical element.

According to a first aspect of the present invention, a wavelength-selecting optical element includes a cholesteric layer that reflects or transmits either of a right-handed circularly polarized light component and a left-handed circularly polarized light component in a selected wavelength band of an incident light; and a diffusing layer disposed on the exit side of the cholesteric layer to diffuse the circularly polarized light component reflected or transmitted by the cholesteric layer.

In the wavelength-selecting optical element in the first aspect of the present invention, it is preferable that the cholesteric layer is a color filter including red, green and blue pixel regions, and the diffusing layer is superposed on the cholesteric layer.

According to a second aspect of the present invention, an optical display includes a display device adapted to display an image by modulating a light; a cholesteric layer disposed on an optical path for the light that penetrates the display device, the cholesteric layer being adapted to reflect or transmit either of a right-handed circularly polarized light component and a left-handed circularly polarized light component in a selected wavelength band of the light; and a diffusing layer disposed on the exit side of the cholesteric layer to diffuse the circularly polarized light component reflected or transmitted by the cholesteric layer.

In the optical display in the second aspect of the present invention, it is preferable that the display device is a liquid crystal display device, and the cholesteric layer is a color filter including red, green and blue pixel regions.

According to the present invention, the wavelength-selecting optical element includes, in combination, the cholesteric layer that reflects or transmits either of a right-handed circularly polarized light component and a left-handed circularly polarized light component in a selected wavelength band of an incident light; and a diffusing layer disposed on the exit side of the cholesteric layer to diffuse the circularly polarized light component reflected or transmitted by the cholesteric layer. Therefore, an outgoing light emerging from the wavelength-selecting optical element and viewed from a direction at a viewing angle is a mixture of light waves of optional wavelengths, so that the change of wavelength of the outgoing light dependent on the viewing angle can be effectively suppressed. Accordingly, the optical display provided with this wavelength-selecting optical element is capable of preventing the change of hues of colors of displayed images according to a viewing angle and of displaying images in an improved image quality.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1A:
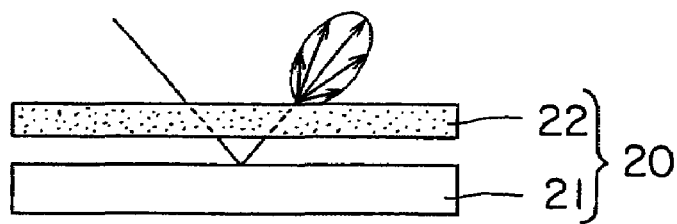
FIGS. 1A and 1B are schematic sectional views of a wavelength-selecting optical element in a preferred embodiment of the present invention.
Figure 1B:
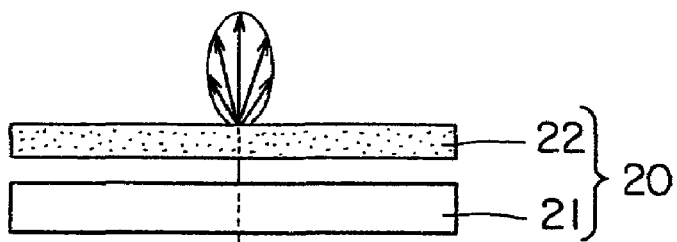

Referring to FIGS. 1A and 1B, a wavelength-selecting optical element 20 in a preferred embodiment of the present invention includes a cholesteric layer 21 that reflects or transmits either of a right-handed circularly polarized light component and a left-handed circularly polarized light component in a selected wavelength band of an incident light; and a diffusing layer 22 disposed on the exit side of the cholesteric layer 21 to diffuse the circularly polarized light component reflected or transmitted by the cholesteric layer 21. The cholesteric layer 21 may be a color filter having pixels each having red, green and blue pixel regions. The pixel regions reflect or transmit either of a right-handed circularly polarized light component and a left-handed circularly polarized light component in a selected wavelength band of an incident light.

The cholesteric layer 21 has cholesteric regularity. The cholesteric layer 21 may be formed of a polymerizable monomer, a polymerizable oligomer or a liquid crystal polymer. Examples of a polymerizable monomer suitable for forming the cholesteric layer 21 include a mixture of a liquid crystalline monomer and a chiral compound as mentioned in Japanese Laid-Open Patent Publication No. 258638/1995 and Published Japanese Translation No. 508882/1998 of PCT International Publication. Examples of a polymerizable oligomer that can be used to form the cholesteric layer 21 include a cyclic organopolysiloxane compound having a cholesteric phase such as mentioned in Japanese Laid-Open Patent Publication No. 165480/1982. Examples of a liquid crystalline polymer suitable for forming the cholesteric film layer 21 include a polymer having a mesogen group, which makes a polymer liquid crystalline, in a main chain, in side chains, or in both the main and side chains; a high-molecular-weight cholesteric liquid crystal having a cholesteryl group introduced into side chains; and liquid crystalline polymers as mentioned in Japanese Laid-Open Patent Publications No. 133810/1997 and No. 293252/1999.

The diffusing layer 22 may be formed of a transparent resin, such as a cellulose resin, an acrylic resin or an epoxy resin, containing a diffusing agent of fine particles of an organic or inorganic material. Preferably, the difference in refractive index between the transparent resin and the diffusing agent is in the range of 0.02 to 1.0. When the difference in refractive index is 0.02 or above, the diffusing layer 22 is able to exercise a sufficient diffusing effect even if the diffusing layer 22 has the least necessary diffusing agent content. When the difference in refractive index is not greater than 1.0, the diffusing layer 22 has a sufficient diffusing agent content and a uniform light diffusing characteristic. Preferably, the diffusing agent has a particle size in the range of 5 nm to 50 μm. A diffusing agent having a particle size not smaller than 5 nm can be easily dispersed in the transparent resin. When the particle size of the diffusing agent is not greater than 50 μm, the whitening of the surface of the diffusing layer 22 and the visibility of a screen, which are caused due to the projection of the particles of the diffusing agent from the surface of the diffusing layer 22, can be avoided.

Figure 3:
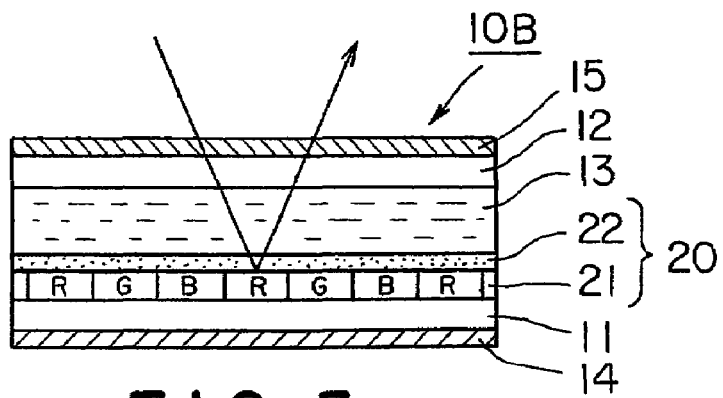
FIG. 3 is a typical sectional view of a reflective type liquid crystal display in a modification of the reflective type liquid crystal display shown in FIG. 2.

Preferably, the surface of the diffusing layer 22 has a haze with respect to a direction normal to the surface in the range of 3 to 85, and the difference between the haze with respect to a direction normal to the surface and the haze with respect to oblique directions at ±60° to the normal to the surface is in the range of 0.1 to 7. When the diffusing layer 22 has a haze below 3 with respect to a direction normal to the surface, the diffusing layer 22 does not have any diffusing property. When the diffusing layer 22 has a haze exceeding 85, the diffusing layer 22 is excessively diffusive and becomes clouded. When the difference between the haze with respect to a direction normal to the surface and the haze with respect to oblique directions at ±60° to the normal to the surface exceeds 7, the screen of an optical display provided with the wavelength-selecting optical element 20 is unable to be illuminated in uniform brightness and images cannot be displayed in a satisfactory image quality. Preferably, the surface of the diffusion layer 22 has a surface roughness Ra of 2 μm or below. When the diffusing layer 22 is incorporated into a liquid crystal cell as shown in FIG. 3, it is preferable that the surface roughness Ra is 0.3 μm or below.

There are various resin compounds as a transparent resin suitable for forming the diffusing layer 22. Preferably, the transparent resin forming the diffusing layer 22 is a cellulose resin, such as triacetyl cellulose (refractive index: 1.50), cellulose acetate propionate (refractive index: 1.47), cellulose acetate butyrate (refractive index: 1.47 to 1.50), cellulose (refractive index: 1.54), or cellulose tributyrate (refractive index: 1.48). Preferably, particles of the diffusing agent of the diffusing layer 22 are organic particles, such as plastic beads. A diffusing agent having a high transparency and a refractive index meeting the foregoing condition for the difference in refractive index between the transparent resin and the diffusing agent is the most preferable. Suitable plastic beads are those of melamine (refractive index: 1.57), acrylic (refractive index: 1.49), acryl-styrene (refractive index: 1.54), polycarbonate, polyethylene or vinyl chloride. The diffusing agent may be an inorganic material, such as cerium oxide (refractive index: 1.63). If the diffusing layer 22 is formed in a liquid crystal cell, it is preferable to use an acrylic resin.

Description will be made of an optical display in a preferred embodiment of the present invention provided with the wavelength-selecting optical element 20 shown in FIGS. 1A and 1B with reference to FIG. 2, in which the optical display is supposed to be a reflective type liquid crystal display by way of an example.

Figure 2:
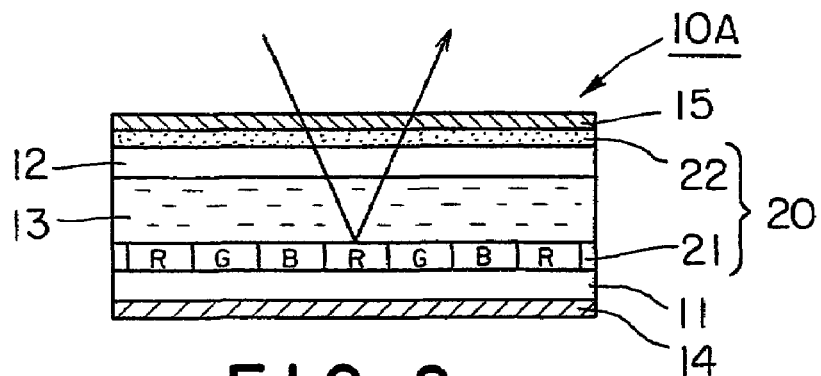
FIG. 2 is a typical sectional view of a reflective type liquid crystal display (optical display) provided with the wavelength-selecting optical element shown in FIG. 1.

Referring to FIG. 2, a reflective type liquid crystal display 10A in a preferred embodiment of the present invention has a liquid crystal panel, for displaying an image by polarizing (modulating) a light, including a back glass substrate 11, a front glass substrate 12 disposed opposite to the back glass substrate 11, and a liquid crystal layer 13 sandwiched between the glass substrates 11 and 12. An absorption plate 14 is attached to the outer surface of the back glass substrate 11. A polarizing plate 15 is attached to the outer surface of the front glass substrate 12 facing the user. The absorption plate 14 may be disposed between the back glass substrate 11 and the cholesteric layer 21.

A cholesteric layer 21 is contiguous with the inner surface of the back glass substrate 11. A diffusing layer 22 is sandwiched between the front glass substrate 12 and the polarizing plate 15. The cholesteric layer 21 and the diffusing layer 22 are placed on the optical path of the light penetrating a liquid crystal display device including the glass substrates 11 and 12 and the liquid crystal layer 13. The cholesteric layer 21 and the diffusing layer 22 form the wavelength-selecting optical element 20. The respective inner surfaces of the back glass substrate 11 and the front glass substrate are provided with TFTs (thin-film transistors), not shown, and pixel electrodes, not shown, formed by processing an ITO film.

A method of fabricating the reflective type liquid crystal display 10A will be described.

A liquid mixture prepared by mixing a polymerizable monomer or a polymerizable oligomer having cholesteric regularity, a photoporimerization initiator, and a chiral agent for red pixel regions is spread on the inner surface of the back glass substrate 11 by a spin coating process in a red cholesteric film. The red cholesteric film is exposed to ultraviolet rays for a predetermined time through a red pixel region forming mask for hardening, and unnecessary parts of the red cholesteric film were removed to form red pixel regions "R ". Similarly, a liquid mixture containing a chiral agent for green pixel regions is spread on the inner surface of the back glass substrate 11 by a spin coating process in a green cholesteric film, the green cholesteric film is patterned to form green pixel regions "G". Similarly, a liquid mixture containing a chiral agent for blue pixel regions is spread on the inner surface of the back glass substrate 11 by a spin coating process in a blue cholesteric film, the blue cholesteric is patterned to form blue pixel regions "B". Thus, the cholesteric layer 21 as a color filter having the red pixel regions "R", the green pixel regions "G" and the blue pixel regions "B" is completed.

A liquid mixture of a transparent resin, such as a transparent cellulose resin, and a diffusing agent of fine particles of an organic or inorganic material is spread in a film on the outer surface of the front glass substrate 12 having the inner surface coated with an ITO film, not shown, by a spin coating process to from the diffusing layer 22.

Then, the glass substrates 11 and 12 are superposed with a spacer held therebetween so as to form a space therebetween. A liquid crystal is poured into the space between the glass substrates 11 and 12 to form the liquid crystal layer 13. Then, the absorbing plate 14 is attached to the outer surface of the back glass substrate 11, and the polarizing plate 15 is attached to the outer surface of the front glass substrate 12 to complete the reflective type liquid crystal display 10A.

Thus, the wavelength-selecting optical element 20 includes, in combination, the cholesteric layer 21 that reflects either of a right-handed circularly polarized light component and a left-handed circularly polarized light component in a selected wavelength band of an incident light, and the diffusing layer 22 disposed on the front side of the cholesteric layer 21 to diffuse the circularly polarized light component reflected by the cholesteric layer 21. Therefore, an outgoing light emerging from the wavelength-selecting optical element 20 and viewed from a direction at a viewing angle $\theta$ is a mixture of light waves of optional wavelengths, so that the change of the wavelength $\lambda_0$ of the outgoing light dependent on the viewing angle $\theta$ can be effectively suppressed. Accordingly, the reflective type liquid crystal display 10A provided with this wavelength-selecting optical element 20 is capable of preventing the change of hues of colors of displayed images according to the viewing angle $\theta$ and of displaying images in an improved image quality.

Since the diffusing layer 22 diffuses the circularly polarized light component reflected by the cholesteric layer 21, the reflective type liquid crystal display 10A provided with the wavelength-selecting optical element 20 permits image observation from a direction at a large viewing angle, and suppresses boundary reflection attributable to the difference in refractive index between the component layers of the reflective type liquid crystal display 10A, that spoiling the visibility of displayed images can be effectively prevented.

Although the cholesteric layer 21 is formed on the inner surface of the back glass substrate 11, and the diffusing layer 22 is formed on the outer surface of the front glass substrate 12 in the reflective type liquid crystal display 10A shown in FIG. 2, in a reflective type liquid crystal display 10B shown in FIG. 3 in a modification of the reflective type liquid crystal display 10A, both the cholesteric layer 21 and the diffusing layer 22 of the wavelength-selecting optical element 20 are formed on the inner surface of the back glass substrate 11.

Figure 4:
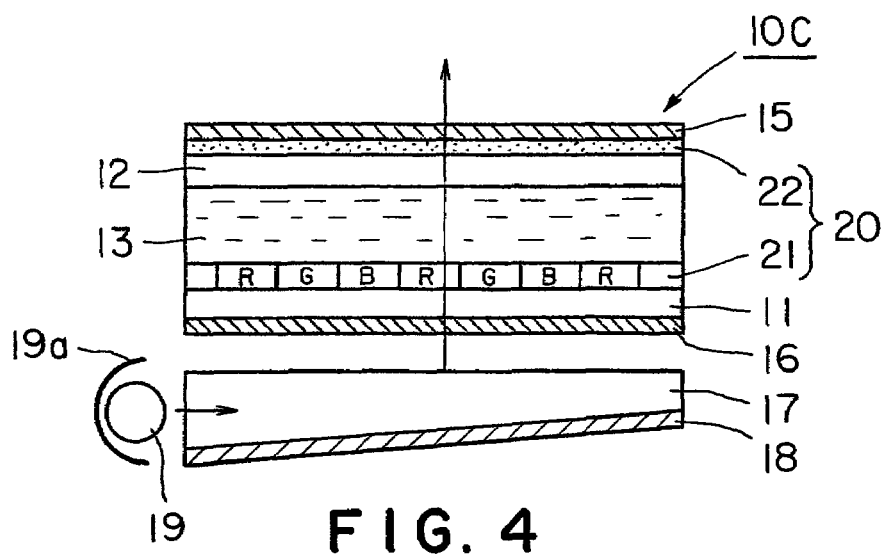
FIG. 4 is a typical sectional view of a transmissive type liquid crystal display (optical display) provided with the wavelength-selecting optical element shown in FIG. 1.
Figure 5:
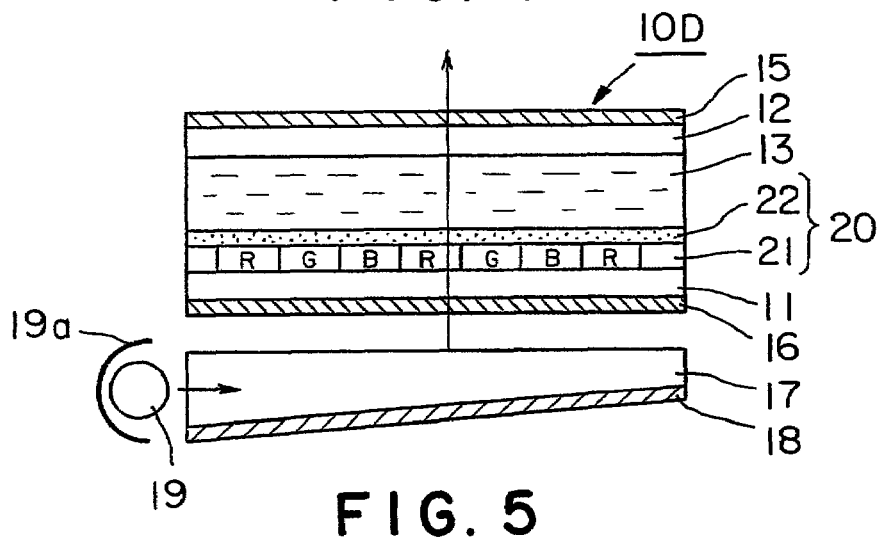
FIG. 5 is a typical sectional view of a transmissive type liquid crystal display in a modification of the transmissive type liquid crystal display shown in FIG. 4.

Although the wavelength-selecting optical element 20 has been described as applied to the reflective type liquid crystal displays 10A and 10B respectively shown in FIGS. 2 and 3 by way of an example, the same is applicable also to transmissive type liquid crystal displays 10C and 10D shown in FIGS. 4 and 5. As shown in FIGS. 4 and 5, each of the transmissive type liquid crystal displays 10C and 10D is provided with a light guide 17 that receives light through a side surface and emits light through the upper surface, a light source 19 that emits light toward the side surface of the light guide 17, and a reflecting plate 18 attached to the back surface of the light guide 17 to reflect light fallen on the back surface of the light guide 17. A reflecting plate 19a is disposed behind the light source 19. A polarizing plate 16 is attached to the outer surface of a back glass substrate 11. The cholesteric layer 21 of the wavelength-selecting optical element 20 does not need necessarily to be formed on the inner surface of the back glass substrate 11. Both the cholesteric layer 21 and the diffusing layer 22 may be formed on the inner surface of a front glass substrate 12.

EXAMPLES

Examples of the liquid crystal display of the present invention will be described with reference to FIGS. 6 to 10.

Example

A reflective type liquid crystal display in an example of the reflective type liquid crystal display 10A shown in FIG. 2 was fabricated.

A cholesteric layer included in a wavelength-selecting optical element was formed of a material containing a polymerizable monomer.

A 3 μm thick film of a liquid mixture of a composition specified below was formed on a glass substrate by spreading the liquid mixture on a glass substrate by a spin coating process in a film, drying the film, and orienting the film at 80° C. The film was exposed to ultraviolet rays of an intensity of 5 mW/cm$^2$ for 5 seconds through a red pixel region forming mask for hardening, and unnecessary parts of the film was removed to form red pixel regions "R".

<Composition of the Liquid Mixture>

Monomer expressed by the following chemical formula having polymerizable acrylates at its opposite ends, and spacers between a mesogen at the middle and each acrylate, and having a nematic-isotropic transition temperature of 110° C.: 80 parts by weight Photoporimerization initiator (IRG369, Ciba Speciality Chemicals): 3 parts by weight Chiral agent having polymerizable acrylates at its opposite ends: 3 parts by weight Toluene: 100 parts by weight.

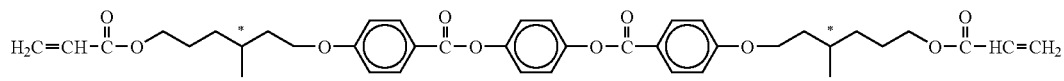

Similarly, green pixel regions "G" were formed by spreading a liquid mixture of a composition similar to the foregoing composition except that chiral agent content was 5 parts by weight instead of 3 parts by weight, and patterning a polymerized film of the liquid mixture. Then, blue pixel regions "B" were formed similarly by spreading a liquid mixture of a composition similar to the foregoing composition except that chiral agent content was 6 parts by weight instead of 3 parts by weight, and patterning a polymerized film of the liquid mixture to complete a cholesteric layer (color filter) having the red pixel regions "R", the green pixel regions "G" and the blue pixel regions "B".

A diffusing layer of the wavelength-selecting optical element was formed of a cellulose resin containing a diffusing agent of fine particles of an organic material. A 10 μm thick diffusing layer was formed on a surface of a front glass substrate opposite to a surface of the same coated with an ITO film by spreading a liquid of the following composition in a film by a gravure coating process, drying the film and heating the dried film at 100° C.

<Composition of Diffusing Layer Forming Liquid>

Cellulose-acetate-propionate resin (refractive index: 1.50) ("CELLIDOR CP", Bayer): 100 parts by weight Melamine beads (refractive index: 1.57, Mean particle size: 1.2 μm) ("EPOSTAR", Nippon Shokubai K.K.): 3.89 parts by weight Toluene: 1000 parts by weight The diffusing layer thus formed on the front glass substrate had a haze of 30 with respect to a direction normal to its surface. The difference between the haze with respect to a direction normal to the surface and the haze with respect to oblique directions at ±60° to the normal to the surface was 3. The surface roughness Ra of the diffusing layer 22 was 0.3 μm.

Then, the glass substrates respectively provided with the cholesteric layer and the diffusing layer were superposed with a spacer held therebetween so as to form a space therebetween. A liquid crystal was poured into the space between the glass substrates to form the liquid crystal layer. Then, an absorbing plate was attached to the outer surface of the back glass substrate, and a polarizing plate was attached to the outer surface of the front glass substrate to complete the reflective type liquid crystal display as shown in FIG. 2.

Comparative Example

A reflective type liquid crystal display in a comparative example was fabricated. The reflective type liquid crystal display in the comparative example was identical with the foregoing reflective type liquid crystal display in the example, except that the former was not provided with any layer corresponding to the diffusing layer of the latter.

The reflective type liquid crystal display in the comparative example were subjected to the measurement of color reproducing regions (Measurement 1) and the measurement of color variation with a viewing angle (Measurement 2).

Measurement 1

Figure 6:
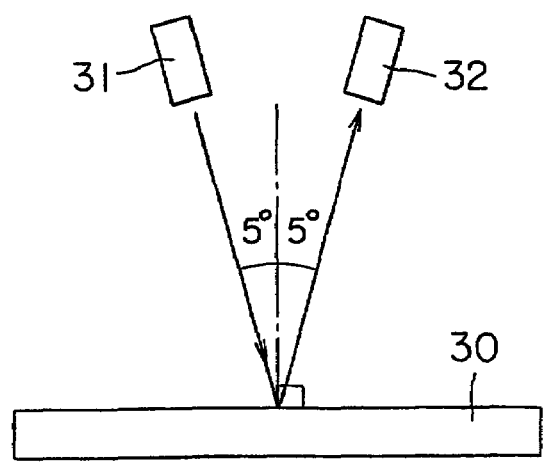
FIG. 6 is a schematic view of a measuring device used in Measurement 1.

A measuring device shown in FIG. 6 was used for measuring color reproducing regions. Light (unpolarized light) emitted by a light source (D65 light source) 31 was projected on the surface of a test sample 30, i.e., the reflective type liquid crystal display in the example or the comparative example, at an incident angle of 5°. Reflected light (polarized light) reflected at a reflection angle of 5° was detected by a detector 32.

Figure 7:
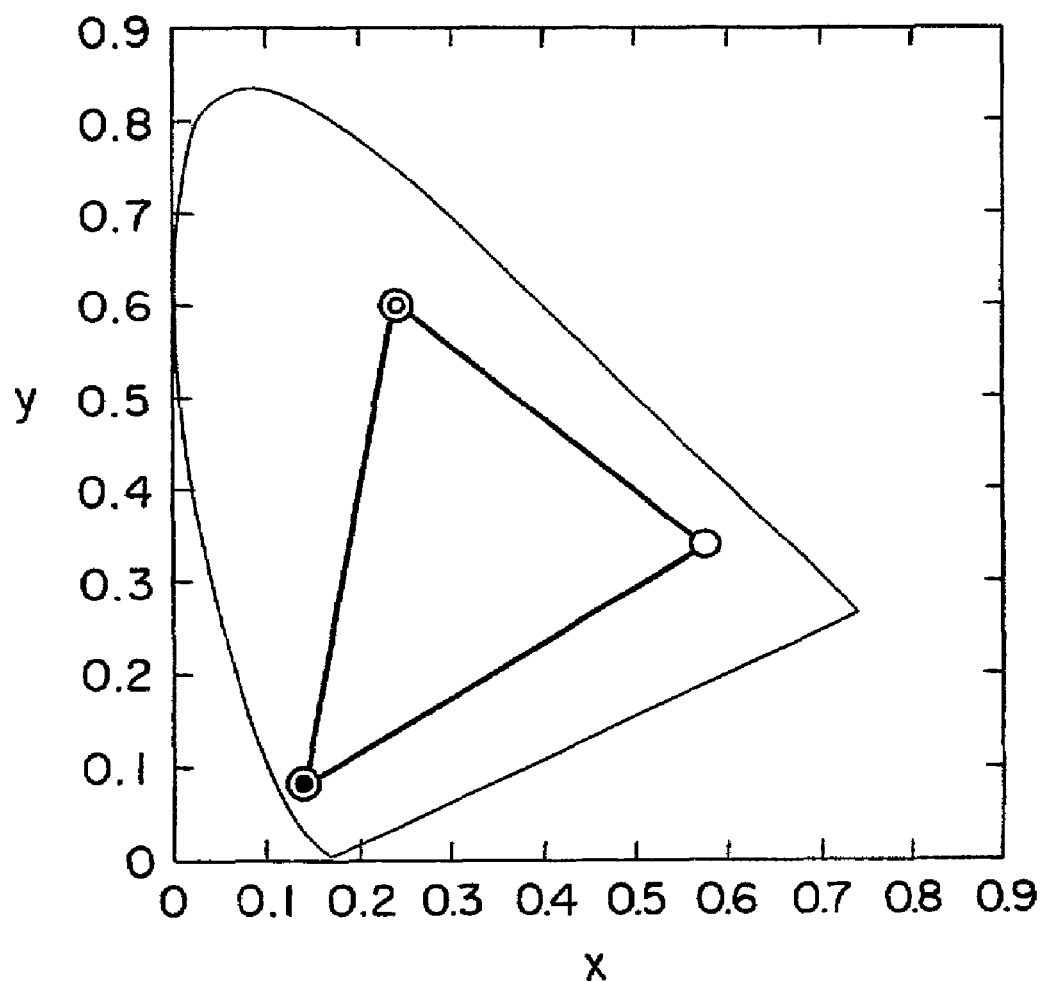
FIG. 7 is a chromaticity diagram indicating color reproduction regions for an example.
Figure 8:
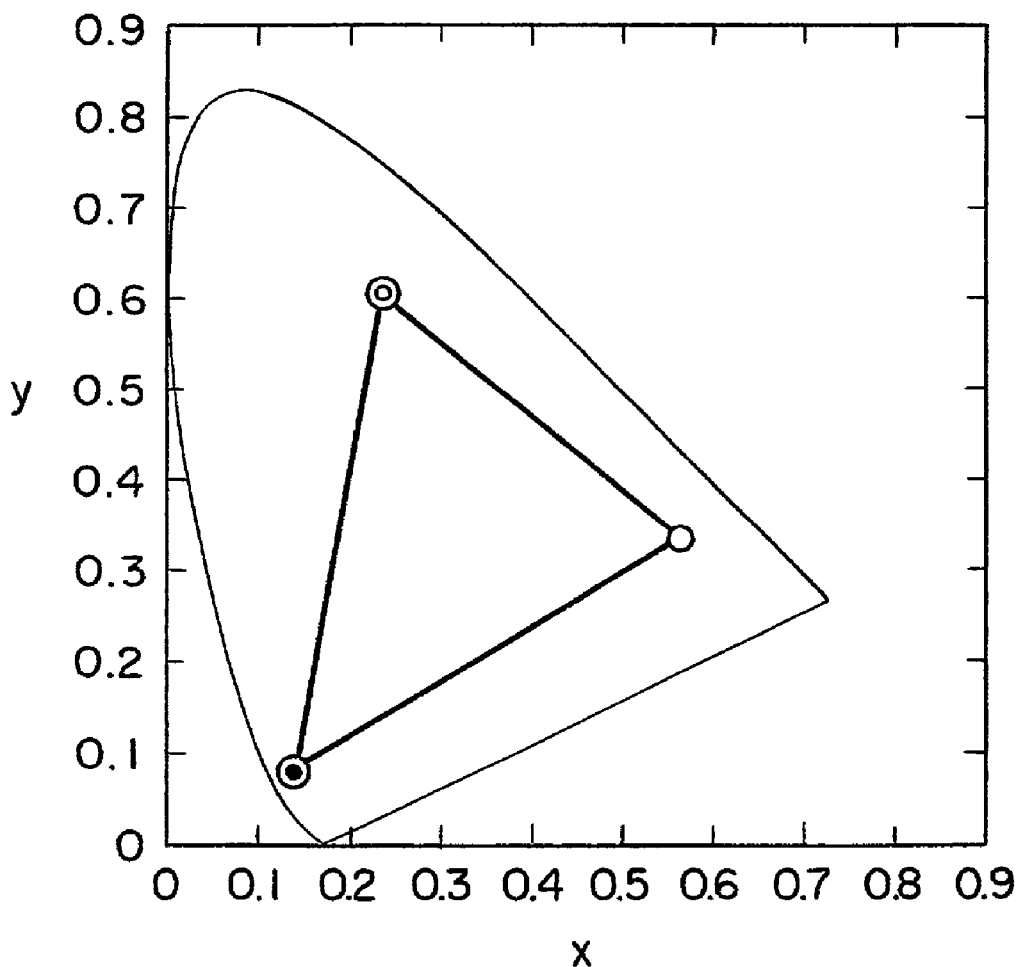
FIG. 8 is a chromaticity diagram indicating color reproduction regions for a comparative example.

FIGS. 7 and 8 are chromaticity diagrams showing measured color reproducing regions of the example and the comparative example, respectively. In each of the chromaticity diagrams shown in FIGS. 7 and 8, apexes of a triangle represent the respective chromaticity coordinates of red, green and blue reproduced by the red, the green and the blue pixel regions of the cholesteric layer. As obvious from FIGS. 7 and 8, the color reproducing regions (color purities) of the test sample 30 of the example and the test sample 30 not provided with a diffusing layer of the comparative example were substantially identical.

Measurement 2

Figure 9:
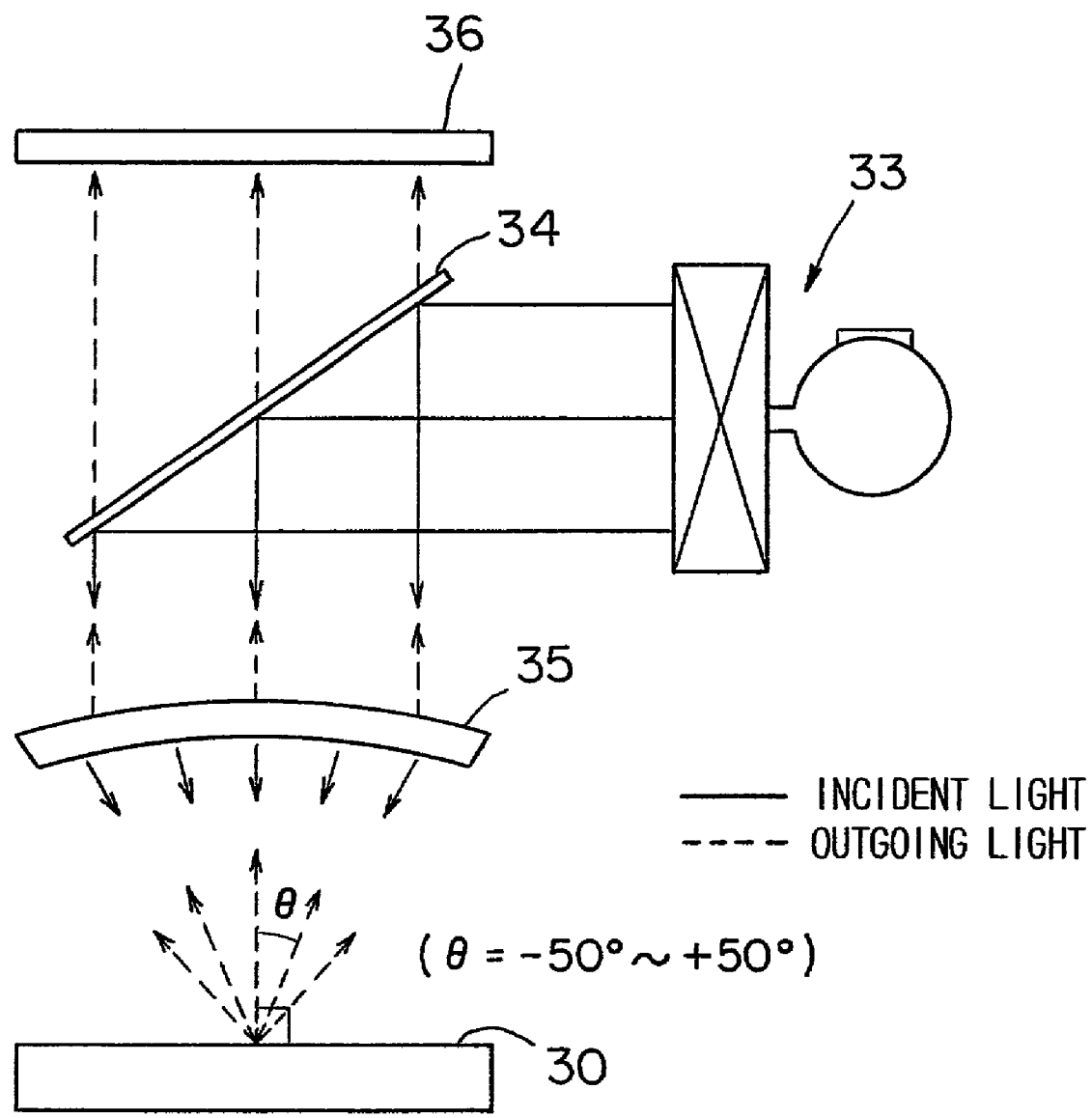
FIG. 9 is a diagrammatic view of a measuring device used in Measurement 2.

A measuring device shown in FIG. 9 was used for measurement. Light (unpolarized light) emitted by a diffusion light source 33 was reflected by a semitransparent mirror 34 toward a Fourier lens 35 to make the light fall on a test sample 30 of the example or the comparative example at an incident angle θ in the range of −80° to +80°. Reflected light reflected by the test sample 30 at a reflection angle θ in the range of −50° to +50° was guided by the Fourier lens 35 and the semitransparent mirror 34 to a CCD sensor 36 to measure chromaticity coordinates for each reflection angle θ.

Figure 10:
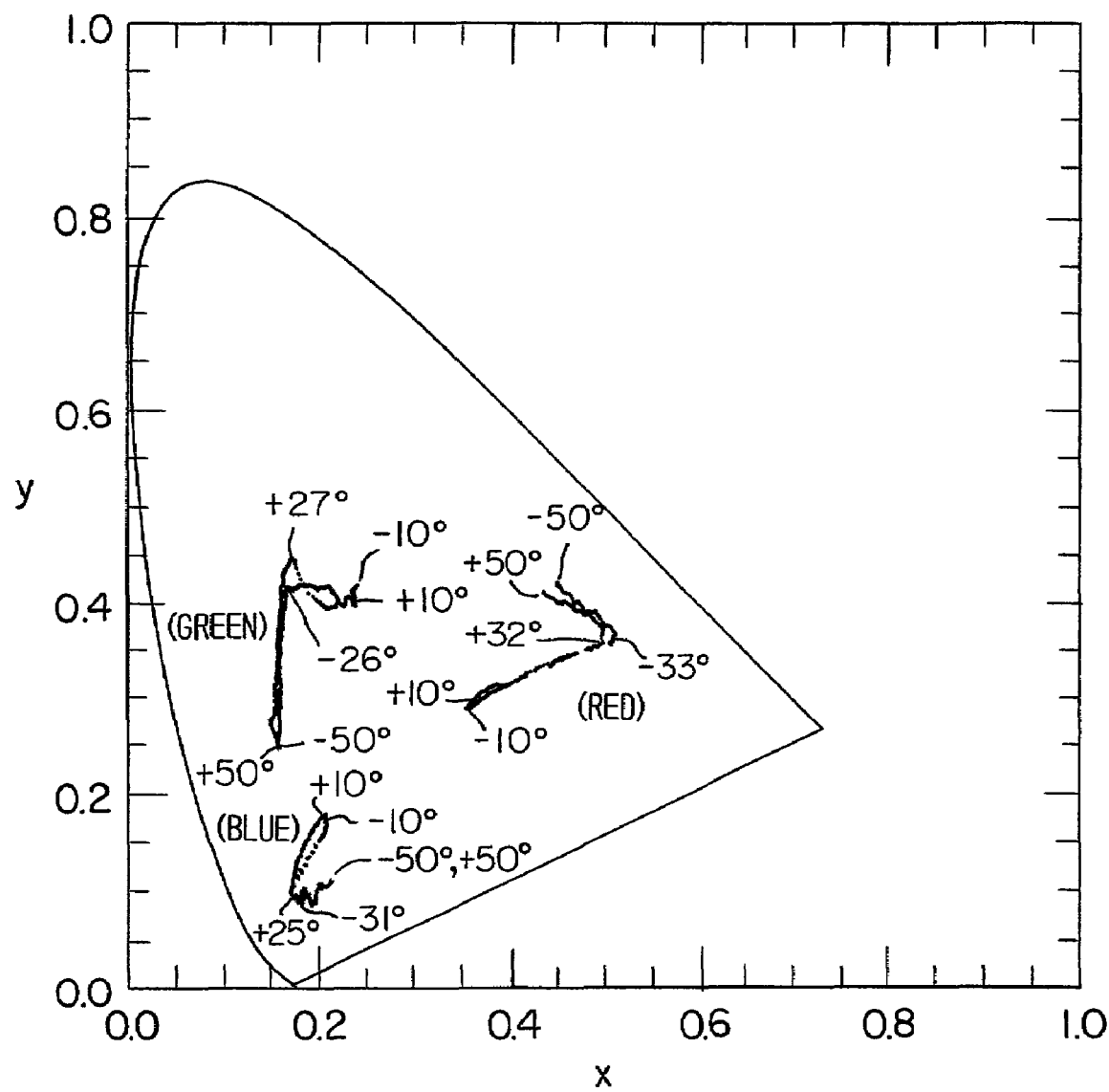
FIG. 10 is a chromaticity diagram showing color shift in an example.
Figure 11:
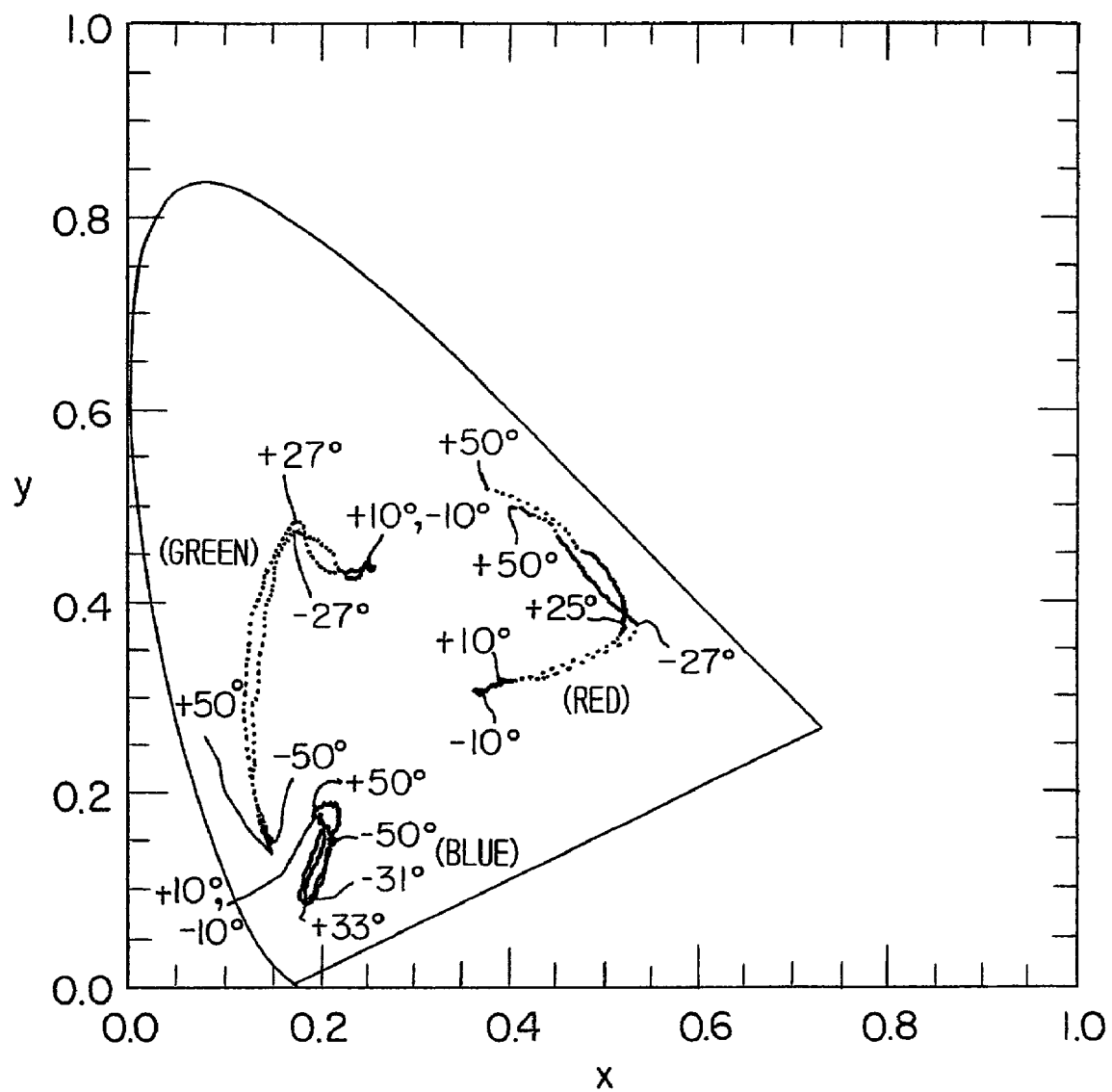
FIG. 11 is a chromaticity diagram showing color shift in a comparative example.

FIGS. 10 and 11 are chromaticity diagrams representing modes of color shift for the example and the comparative example. In FIGS. 10 and 11, chromaticity coordinates of red, green and blue reproduced by the red, the green and the blue pixel regions of the cholesteric layer are plotted for reflection angles θ.

As obvious from FIGS. 10 and 11, changes of hues of colors (color shift), dependent on the reflection angle θ, of the light reflected by the test sample 30 of the example were small as compared with those of light reflected by the test sample 30 of the comparative example.

Images displayed on the test samples 30 of the example and the comparative example were observed visually. The test sample 30 of the example 30, as compared with that of the comparative example, had a wide viewing angle, and the quality of the image displayed by the test sample 30 of the example was not spoiled by boundary reflection or the like.

As apparent form the foregoing description, the present invention is capable of preventing the change of hues of colors of displayed images dependent on viewing direction to improve image quality.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An optical display comprising:
   a display device adapted to display an image by modulating light;
   a cholesteric layer disposed on an optical path for the light that penetrates the display device, the cholesteric layer being adapted to reflect or transmit either of a right-handed circularly polarized light component and a left-handed circularly polarized light component in a selected wavelength band of the light, the cholesteric layer being a hardened layer having cholesteric regularity and formed of a material selected from the group consisting of a hardened polymerizable monomer, a hardened polymerizable oligomer, and a liquid crystal polymer; and
   a diffusing layer disposed on an exit side of the cholesteric layer to diffuse the circularly polarized light component reflected or transmitted by the cholesteric layer.

2. The optical display according to claim 1, wherein the display device is a liquid crystal display device.

3. The optical display according to claim 1, wherein the cholesteric layer is a color filter including red, green and blue pixel regions.

4. The optical display according to claim 1, wherein the diffusing layer is formed of a transparent resin containing a diffusing agent of fine particles of an organic or inorganic material.

5. The optical display according to claim 4, wherein a difference in refractive index between the transparent resin and the diffusing agent is in a range of 0.02 to 1.0.

6. The optical display according to claim 4, wherein the diffusing agent has a particle size in a range of 5 nm to 50 μm.

7. The optical display according to claim 1, wherein a surface of the diffusing layer has a haze with respect to a direction normal to the surface in a range of 3 to 85.

8. The optical display according to claim 7, wherein a difference between a haze of the surface of the diffusing layer with respect to a direction normal to the surface and a haze of the surface of the diffusing layer with respect to oblique directions at ±60° to the normal to the surface is in a range of 0.1 to 7.

9. The optical display according to claim 1, wherein a surface of the diffusing layer has a surface roughness Ra of 2 μm or below.

10. The optical display according to claim 9, wherein the surface of the diffusing layer has a surface roughness Ra of 0.3 μm or below.

* * * * *